United States Patent [19]

Andreussi et al.

[11] Patent Number: 4,990,573

[45] Date of Patent: Feb. 5, 1991

[54] METHOD FOR PREPARING POLYBUTADIENE ENDOWED WITH IMPROVED PROCESSABILITY CHARACTERISTICS

[75] Inventors: Piero Andreussi, Milan; Renzo Bianchi, Melegnano; Mario Bruzzone, San Donato Milanese, all of Italy

[73] Assignee: Enichem Elastomeri S.p.A., Palermo, Italy

[21] Appl. No.: 479,399

[22] Filed: Feb. 13, 1990

[30] Foreign Application Priority Data

Feb. 17, 1989 [IT] Italy .............................. 19484 A/89

[51] Int. Cl.$^5$ ............................ C08F 2/06; C08F 6/06
[52] U.S. Cl. .............................. 525/332.3; 525/333.2; 525/340; 526/78; 526/86; 526/142; 526/164; 526/340.4
[58] Field of Search ................... 525/332.3, 333.2, 340; 528/487; 526/340.4, 86142, 164, 78

[56] References Cited

U.S. PATENT DOCUMENTS 3,704,286 11/1972 Schafer et al. ............... 525/332.3 X
4,699,960 10/1987 Gordini et al. ................... 526/86 X

FOREIGN PATENT DOCUMENTS 0127236 12/1984 European Pat. Off. ......... 526/340.4
0201962 11/1986 European Pat. Off. ......... 526/340.4

OTHER PUBLICATIONS

Hackh's Chem. Dict., J. Grant (ed.), McGraw-Hill, Inc., N.Y. (1969) pp. 571-572.

*Primary Examiner*—Fred Teskin
*Attorney, Agent, or Firm*—Hedman, Gibson, Costigan & Hoare

[57] ABSTRACT

The processability of a polybutadiene with a high content of 1,4-cis-structure is improved by means of the addition of $PCl_3$ before the polymerization reaction is quenched and when Mooney viscosity of polybutadiene has reached a prefixed value, preferably lower than, or equal to 30; the polymerization of butadiene is carried out in a solution in an aliphatic or cycloaliphatic solvent, in the presence of a catalytic system based on rare earths, preferably a neodymium-based catalytic system.

8 Claims, No Drawings

METHOD FOR PREPARING POLYBUTADIENE ENDOWED WITH IMPROVED PROCESSABILITY CHARACTERISTICS

The present invention relates to a method for improving the processability of a polybutadiene polymer with a high content of 1,4-cis-structure, which polybutadiene is obtained by means of the polymerization, preferably carried out in solution in an aliphatic or cycloaliphatic solvent, of butadiene in the presence of a catalytic system based on compounds of the elements belonging to the group of the rare earths, or of the same rare earths in elemental form. The method consists of carrying out such a polymerization until the polymer reaches a certain, prefixed value of Mooney viscosity, preferably not higher than 30, and of adding $PCl_3$ to the solution of the so formed polymer, before the polymerization reaction is quenched.

It is known, e.g., from the U.S. Pat. No. 4,525,549, that a polybutadiene with a high percentage of 1,4-cis-structure ($\geq 97\%$) can be obtained by carrying out the polymerization of the monomer, in solution in an either aliphatic or cycloaliphatic solvent, in the presence of a catalytic system obtained by starting from:

(a) at least one metal belonging to the group of the rare earths, or at least one compound of such a metal, in particular neodymium or a derivative thereof;

(b) at least one aluminum compound having the formula $$AlR_2R'$$

wherein:
R=alkyl, cycloalkyl, arylalkyl; and
R'=either R or H;

(c) at least one compound containing one or more hydroxy groups selected, e.g., from among water, alcohols, carboxy acids; and, optionally (d) at least one inorganic compound containing an organic halo-derivative containing halogen in an ionisable form, corresponding to the formula:

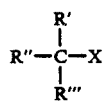

wherein:
R', R" and R''', which can be equal to, or either totally or partially different from, one another, are H, Cl, Br or alkyl, aryl, alkylaryl, halo-alkyl, halo-aryl, alkoxy, cycloalkoxy radicals, and
X is either Br or Cl.

The so obtained polybutadiene, as said, is characterized by a particularly high content of 1,4-cis-units, usually equal to, or higher than 97%; it furthermore displays chemical, morphological and mechanical characteristics which are comparable to, and sometimes higher than, those of the analogous polymers obtained with other catalytic systems.

The present Applicant found now that the behaviour of polybutadiene obtained by means of the use of rare earth-based catalysts, when such a behaviour is considered from the viewpoint of polymer capability of incorporating the fillers customarily employed in order to formulate the rubber compounds for vulcanization, can be improved by means of a suitable post-treatment reaction.

This is a very outstanding feature, if one takes into consideration the action which the inorganic fillers, and in particular carbon black, exert on the end, elastic and mechanical, characteristics of the fabricated article.

In this regard, the incorporation of carbon black into the rubber should preferably take place homogeneously, within relatively short time intervals. The "black incorporation time" ("B.I.T.") is a measure of the time used by the elastomer in order to incorporate carbon black in a homogeneous way: low values of B.I.T. speak in favour of a good elastomer processability, also thanks to the power savings and to the cost savings thus generally achieved.

And namely, the purpose achieved by means of the process according to the present invention precisely is the fact that, by submitting a polybutadiene polymer obtained by using rare earth-based catalysts to post-modification reactions with $PCl_3$, a product is obtained, which is endowed with improved processability characteristics, in terms of B.I.T. values, which are lower than the B.I.T. values shown by polybutadienes obtained with the same catalysts, and having the same Mooney viscosity. Said improvement corresponds to an improvement in processability in general, as set forth by Garvey index, as well as to an improved resistance to cold flow. The technological properties remain unchanged.

Such a result is all the more so surprising, in that halogenated compounds, including $PCl_3$, are known to cause in polybutadiene increases in the molecular masses, sometimes accompanied by undesirable cross-linkings, which impair the good processability of the elastomer.

We refer, e.g., to U.K. patents Nos. 1,108,585 and 1,108,586, to the name of Chemische Werke Hüls, which describe and claim a method for increasing the molecular weight of hydrocarbon polymers, by means of the addition of a halogenated compound to the reaction mixture.

In detail, U.K. 1,108,585 disclosed the polymerization (or copolymerization) of diolefinic monomers, in solution in an organic solvent, in the presence of a catalyst constituted by compounds of elements of the IV, V and VII Groups of the Periodic System in combination with hydro- or alkyl-halides of metals of the II or III Group and in which, at the end of the same polymerization, and when a determined degree of conversion is reached, and before the catalyst is decomposed, a halogenated compound is added to the system.

The purpose of this procedure is of obviating the drawback that one can observe when the above said catalytic systems, in the case in point based on Ti, Co, or Ni, are used, which drawback consists in the fact that a polymer with a Mooney viscosity higher that 50 cannot be obtained: the addition of the halogenated compound seems to make it possible for "defined" end values of Mooney viscosity to be reached which, from the initial values of 20–50, can be as high as 90–140, with an end oil-extendible In its turn, U.K. patent No. 1,108,586 discloses a product being obtained. similar methodology for increasing the molecular weight of polymers from unsaturated hydrocarbons, according to which, in the cross-linking step a halogenated compound is used in combination with a second compound of general formula R$_m$MeX$_{y-n}$ (wherein R = hydrocarbon radical; Me = As, Sb, V, Bi, and so forth; and X = halogen): the purposes are as hereinabove disclosed, and the results are practically the same.

However, the increase in Mooney viscosity is not accompanied by any improvements or changes in elastomer processability.

Therefore, the object of the present invention is a method for improving the processability of a polybutadiene with a high content of 1,4-cis-structure, and its resistance to cold flow, which method consists of polymerizing butadiene in the presence of a catalytic system based on rare earths and, while the polymerization is still in course, submitting the produced polymer to a reaction of post-modification by means of the addition of PCl$_3$: such an addition can be carried out at any values of conversion, even if advantageous results were obtained when PCl$_3$ was added at conversions higher than at least 80% and preferably higher than at least 95%.

In detail, the method according to the present invention is carried out through the following operating steps:

butadiene is polymerized in solution in the presence of a catalytic system based on metals belgonging to the group of rare earths, in accordance with the hereinabove given definition;

at a time point at which the value of Mooney viscosity of polymeric polybutadiene has not exceeded 30 yet, and the conversion is higher than at least 80%, the preselected amounts of PCl$_3$ are added in order to attain the desired increase in viscosity value;

a "short stopper" is added;

modified polybutadiene is recovered according to the methodologies known from the prior art.

The polymerization is thus carried out in a hydrocarbon, preferably aliphatic or cycloaliphatic, solvent, at a temperature which can be selected from within a wide rage (of from −20° C. up to 200° C.); the use, from among the rare earths, of neodymium, praseodymium and cerium, or of derivatives thereof, results to be particularly efficacious.

When Mooney viscosity equals at least 25, and anyway is not higher than 30, and the conversion degree of the monomer is higher than 80%, and preferably is of >95%, PCl$_3$ is added in a prefixed amount, anyway comprised within the range of from 0.05% to 0.2% relatively to the polymer, in hydrocarbon solution, preferably in solution in the same solvent in which the polymerization is carried out.

The reaction of post-modification is continued until the desired value of Mooney viscosity is obtained, as a function of the programmed processability level, with temperature being kept equal to the same values as of polymerization end, and throughout the duration of the post-modification reaction.

When the treatment of polymer post-modification is ended, the reaction is quenched, e.g., with water or alcohols, with the elastomer being precipitated and recovered according to technologies known from the prior art.

The invention is better defined by means of the following exemplifying examples, which is no way shall be construed as being limitative of the same invention.

EXAMPLE No. 1

740 g of anhydrous hexane and 120 g of butadiene are charged in the same order as specified, to a reactor equipped with stirring means. The stirred solution is then heated up to 60° C. and then an amount corresponding to 0.18 mmol/liter of neodymium, of a solution in hexane solvent of the catalyst is added to it, which catalyst solution is prepared by causing neodymium oxide (3 mmol), naphthenic acid (24 mmol), diisobutyl-aluminum hydride (180 mmol) and tert.-butyl chloride (9 mmol) to react with one another in hexane (170 ml).

The reaction of polymerization is allowed to proceed under adiabatic conditions for one hour, with the temperature of the reaction mixture consequently increasing up to 110° C. At the end, the polymerization is quenched by means of the addition of 50 cc of H$_2$O, 1% weight/weight (w/w) (as computed relatively to the polymer) of antioxidant A.O. 2246 is added, and the polymer is separated by means of a steam stripping. The polybutadiene lumps obtained are oven-dried under vacuum at 60° C. for 24 hours. A polybutadiene with Mooney viscosity=41.5 (1+4, 100° C.) is obtained, with the monomer conversion being of 95%, as determined by weighing the dry polymer.

The microstructure of the polymer is as follows:

1,4-cis-units : 97.5%
1,4-trans-units : 1.5%
1,2-units: 1 %

Further properties of so obtained polybutadiene are reported in Table 1.

EXAMPLE No. 2

The process is carried in the same way as of Example 1, except for catalyst amount, which is increased up to 0.22 mmol of neodymium/liter.

At the end of the polymerization reaction, which is still carried out for 60 minutes, with the reaction temperature undergoing the same change from 60° C. up to 110° C., a portion of the polymeric solution (corresponding to about 25 g of dry polymer) is drawn from the reactor and is treated with 25 ml of water in order to quench the polymerization.

An amount of 1% (w/w), relatively to the polymer, of antioxidant A.O. 2246 is then added, and the polymer is separated by steam stripping. The so obtained polybutadiene lumps are oven-dried under vacuum at 60° C. for 24 hours. A polybutadiene with Mooney viscosity =28 is obtained, with the monomer conversion being of ≧95%.

The microstructure of the polybutadiene is the same as of polybutadiene obtained in Example No. 1.

To the residual polymeric solution, kept at the temperature of 110° C., 0.088 g of PCl$_3$ in hexane solution (3.145 ml), corresponding to 0.1% (w/w) relatively to the existing polymer, is added. The reaction is allowed to proceed for 15 minutes, after which time the reaction is quenched, and the subesequent operations of polybutadiene separation and recovery are carried out, in the same way as of Example No. 1.

A polybutadiene with Mooney viscosity =40 is obtained, with the monomer conversion being of ≧95%.

The microstructure of the polybutadiene is the same as of polybutadiene obtained in Example No. 1.

The properties of the so obtained polybutadiene are reported in Table 1.

EXAMPLE No. 3

The process is carried out in the same way as of Example No. 2, except for PCl$_3$ amount, which is increased up to 0.176 g (corresponding to 0.2% w/w as referred to the polymer to be treated). The polybutadiene obtained by means of the same operating modalities as of Example No. 2, has a Mooney viscosity of 50, and shows a value of B.I.T. of three minutes.

A polybutadiene having the same value of Mooney viscosity, as directly resulting from the polymerization, as carried out in the same way as of Example No. 1, except for catalyst amount (8.16 mmol/liter), has a B.I.T. value of 15 minutes.

EXAMPLE No. 4

The process is carried out in the same way as of Example No. 2, except for PCl$_3$ amount, which is increased up to 0.132 g (corresponding to 0.15% w/w as referred to the polymer to be treated).

The polybutadiene obtained by means of the same operating modalities as of Example No. 2, has a Mooney viscosity of 45, and shows a value of B.I.T. of two minutes.

A polybutadiene having the same value of Mooney viscosity, as directly resulting from the polymerization, as carried out in the same way as of Example No. 2, except for catalyst amount (0.17 mmol/liter), has a B.I.T. value of 13 minutes.

EXAMPLE No. 5

The process is carried in the same way as of Example 1, except for catalyst amount, which is increased up to 0.20 mmol of neodymium/liter.

The polymerization reaction is allowed to proceed under adiabatic conditions for 40 minutes; with the reaction temperature consequently increasing up to 110° C. At the end of this time period, a portion of the polymeric solution is drawn from the reactor and is treated with water in order to quench the polymerization; an amount of 0.1% (w/w), relatively to the polymer, of antioxidant A.O. 2246 is then added to said portion, and the polymer is separated by steam stripping. The so obtained polybutadiene, after being oven-dried under vacuum at 60° C. for 24 hours, shows a Mooney viscosity 28, with the monomer conversion being of 80%.

To the residual polymeric solution, kept at the temperature of 110° C., an amount of PCl$_3$ is added, which corresponds to 0.1% (w/w) relatively to the existing polymer.

The post-treatment process is then continued in the same way as disclosed in Example No. 2.

A polymer is obtained, whose Mooney viscosity is 41, with the monomer conversion being of 80%.

The properties of this polymer are the same as of the product of Example No. 2, as set forth in Table 1.

TABLE 1

Influence of the post-modification with PCl$_3$ on all the properties of a polybutadiene obtained with Nd-based catalyst.

|  | Polybutadiene resulting from polymerization (Example 1) | Polybutadiene resulting from polymerization and post-modified with PCl$_3$ (Example 2) |
|---|---|---|
| UNCURED POLYMER | | |
| M$_L$ (1 + 4/100° C.) | 41.5 | 40 |
| B.I.T. | 6 min 15 sec | 2 min 30 sec |
| Cold Flow (mg/hour) | 37 | 11 |
| Garvey Index | 3 (1—1—1) | 9 (3—3—3) |
| RHEOMETRY AT 145° C. | | |
| MH (pounds/inch) | 44.4 | 40.9 |
| M$_L$ (pounds/inch) | 10.4 | 8 |
|  | 34 | 32.9 |
| Ts$_2$ (minutes) | 7.07 | 8.07 |
| Tc$_{90}$ (minutes) | 18.34 | 20.14 |
| VULCANISED POLYMER | | |
| M 300% (MPa) (*) | 13.1 | 11.9 |
| Tensile strength (MPa) (*) | 24.4 | 22.8 |
| Elongation at break (%) (*) | 460 | 485 |
| Hardness (Shore A) (**) | 68 | 69 |

(*) A.S.T.M. D 412
(**) A.S.T.M. D 676

We claim:

1. Method for preparing polybutadiene with a high content of 1,4-cis-structure, endowed with characteristics of improved processability and of improved resistance to cold flow, which method consists of polymerizing butadiene, in solution in a hydrocarbon solvent, in the presence of a catalytic system comprising at least one metal belonging to the group of the rare earths and of adding PCl$_3$ to the polymeric solution before the polymerization is quenched and when the Mooney viscosity is higher than 25.

2. Method for preparing polybutadiene with a high content of 1,4-cis-structure, endowed with characteristics of improved processability and of improved resistance to cold flow according to claim 1, characterized in that PCl$_3$ is added to the polymeric solution when the value of Mooney viscosity of polybutadiene is higher than 25 and is not higher than 30, and monomer conversion is higher than 80%.

3. Method for preparing polybutadiene endowed with characteristics of improved processability and of improved resistance to cold flow according to claim 2, in which butadiene polymerization is carried out in solution in an aliphatic or cycloaliphatic hydrocarbon, in the presence of a catalytic system obtained from:

(a) at least one metal belonging to the groups of the rear earths or at least one compound of said metal;

(b) at least one aluminum compound having the formula

AlR$_2$R′, wherein:
R=alkyl, cycloalkyl, arylalkyl, and
R′=either R or H (c) at least one compound containing one or more hydroxy group(s); and, optionally, (d) at least one inorganic compound containing an organic halo-derivative containing either chlorine or bromine in an ionisable form, corresponding to the formula:

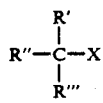

wherein:

R', R", R''' are independently selected from H, Cl, Br or alkyl, aryl, alkylaryl, haloalkyl, halo-aryl, alkoxy, cycloalkoxy radicals, and X is either Br or Cl.

4. Method for preparing polybutadiene endowed with characteristics of improved processability and of improved resistance to cold flow according to claim 3, characterized in that the reaction of polymerization is carried out at a temperature selected from within the range of from $-20°$ C. up to 200° C., as a function of the desired value of Mooney viscosity.

5. Method for preparing polybutadiene endowed with characteristics of improved processability and of improved resistance to cold flow according to claims 1 or 2, characterized in that the reaction of polymerization is preferably carried out in the presence of a catalytic system based on neodymium or on a neodymium compound.

6. Method for preparing polybutadiene endowed with characteristics of improved processability and of improved resistance to cold flow according to claim 1, characterized in that reaction of post-modification is carried out by means of the addition of $PCl_3$ in amounts comprised within the range of from 0.05% to 0.2%, as computed relatively to the polymer.

7. A method for preparing polybutadiene as defined in claim 3, wherein said metal comprises neodymium or a compound thereof.

8. A method for preparing polybutadiene as defined in claim 3 wherein said compound containing one or more hydroxy groups is selected from the group consisting of water, alcohols and carboxy acid.

* * * * *